United States Patent
Andersson et al.

(10) Patent No.: US 6,847,603 B2
(45) Date of Patent: Jan. 25, 2005

(54) INFORMATION RECORDING APPARATUS

(75) Inventors: Peter Andersson, Lund (SE); Markus Nilsson, Lund (SE)

(73) Assignee: Obducat Aktiebolag, Malmo (SE)

( * ) Notice: Subject to any disclaimer, the term of this patent is extended or adjusted under 35 U.S.C. 154(b) by 624 days.

(21) Appl. No.: 09/881,022

(22) Filed: Jun. 15, 2001

(65) Prior Publication Data

US 2002/0018110 A1 Feb. 14, 2002

Related U.S. Application Data

(60) Provisional application No. 60/211,786, filed on Jun. 16, 2000.

(51) Int. Cl.[7] .................................................. G11B 7/00
(52) U.S. Cl. ....................................... 369/101; 369/263
(58) Field of Search .......................... 369/44.11, 44.39, 369/53.25, 53.28, 53.29, 101, 120, 121, 126, 258, 263, 270, 271

(56) References Cited

U.S. PATENT DOCUMENTS 4,074,313 A * 2/1978 Reisner et al. ........... 369/44.39

| 5,446,722 A | 8/1995 | Kojima et al. |
| 5,686,941 A | 11/1997 | Kojima |
| 6,203,968 B1 * | 3/2001 | Igarashi ...................... 430/320 |
| 6,414,916 B1 * | 7/2002 | Kojima ................... 369/44.11 |

FOREIGN PATENT DOCUMENTS

GB        1458778        12/1976

* cited by examiner

*Primary Examiner*—Paul W. Huber
(74) *Attorney, Agent, or Firm*—Finnegan, Henderson, Farabow, Garrett & Dunner, L.L.P.

(57) ABSTRACT

An information recording apparatus comprises a vacuum chamber, an energy beam generator emitting an energy beam for recording information on a substrate in the vacuum chamber, a spindle motor rotating the substrate in the vacuum chamber, a movable holder disposed in the vacuum chamber for carrying the spindle motor, and a feed motor unit connected to the movable holder for linearly moving the substrate in a vacuum atmosphere within the vacuum chamber. The holder, the vacuum chamber, and the energy beam generator are fixed to a common plate-shaped base member. The feed motor unit is connected to the movable holder by means of a hollow rod, a flexible sleeve element being provided over the rod between the feed motor unit and the vacuum chamber wall.

12 Claims, 2 Drawing Sheets

INFORMATION RECORDING APPARATUS

This application claims the benefit of U.S. Provisional Application No. 60/211,786, filed Jun. 16, 2000.

FIELD OF THE INVENTION

The present invention relates to an information recording apparatus for forming patterns on rotating substrates, e.g. for manufacturing information carriers or masters therefor. Such information carriers include optical and magnetic storage devices such as optical disks, magneto-optical discs and patterned magnetic media. More specifically, the present invention relates to an apparatus for writing and/or editing such information carriers or masters by means of an energy beam such as an electron beam or ion beam.

BACKGROUND OF THE INVENTION

A master or information carrier of the above type includes small structures, typically in the nanometer range, which must be produced in a highly evacuated atmosphere. In practice, the energy beam is focused on a recording medium or substrate which is rotated inside a vacuum chamber. By moving the rotating recording medium radially, the energy beam is made to write the information on the recording medium in a helical path, thereby manufacturing a master.

A typical prior art information recording apparatus, known from U.S. Pat. No. 5,446,722, comprises a vacuum chamber, an electron beam generator mounted on a top portion of the vacuum chamber and emitting an electron beam into the vacuum chamber, and a spindle motor driving a spindle to rotate the recording medium in the vacuum chamber. The spindle motor is enclosed in a casing within the vacuum chamber to prevent the magnetic fields of the spindle motor from interfering within the electron beam. The casing is mounted on a movement means effecting radial movement of the rotating spindle. The movement means is in turn mounted on a bottom portion of the vacuum chamber. To reduce friction, the spindle is mounted on a pneumatic bearing on the spindle motor. As a result of the pneumatic bearing, the interior of the casing is in communication with the atmosphere. This prior art apparatus suffers from a number of drawbacks. First, the apparatus is sensitive to changes in ambient temperature and to mechanical vibrations. Such changes will translate into dimensional changes affecting the accuracy with which the structures can be produced on the recording medium. Second, it is a laborious task to mount the electron beam generator precisely perpendicular to the recording medium, complicating both assembly and maintenance of the apparatus. Also, the walls of the vacuum chamber might flex during assembly of the apparatus, thereby changing presumably known dimensional relationships and necessitating excessive fine adjustments on a trial and error basis. Third, it is difficult to completely prevent magnetic fields from entering the vacuum chamber.

A similar information recording apparatus in known from U.S. Pat. No. 5,686,941, in which the radial movement of the spindle is controlled by a feed motor unit arranged outside the vacuum chamber. The feed motor unit drives a screw bar which extends through an opening in a wall portion of the vacuum chamber to a movable holder therein. A spindle motor including a pneumatic bearing is mounted on the holder and is enclosed in a casing communicating with the atmosphere. To seal off the casing from the vacuum chamber, the spindle extends through a magnetic fluid seal which is generated by a magnetic unit producing a magnetic field that interacts with the spindle via a magnetic fluid. Generally speaking, this apparatus suffers from the same drawbacks as the apparatus described by way of introduction. By placing the feed motor unit outside the vacuum chamber, the magnetic field inside the vacuum chamber is reduced, but instead there is an increased risk of leaks, since it is difficult to provide a durable seal between the moving screw bar and the opening in vacuum chamber wall.

Another information recording apparatus having a similar feed motor unit arrangement is disclosed in GB-1,458,778.

SUMMARY OF THE INVENTION

It is an object of the present invention to provide a novel information recording apparatus for forming patterns on rotating substrates which obviates or mitigates at least one of the disadvantages of the prior art.

It is another object of the present invention to provide an information recording apparatus that is of simple construction and allows for high accuracy in the formation of patterns on rotating substrates.

It is yet another object of the present invention to facilitate maintenance and assembly of an information recording apparatus.

These objects are at least partly achieved by an information recording apparatus comprising;

a vacuum chamber;

an energy beam generator partially enclosed in the vacuum chamber for emitting an energy beam for recording information on a recording medium;

a spindle disposed in the vacuum chamber for rotating the recording medium, said spindle being driven to rotate by a spindle motor;

a movable holder disposed in the vacuum chamber for carrying the spindle motor and the spindle;

a feed motor unit connected to the movable holder for linearly moving the spindle in a vacuum atmosphere within the vacuum chamber; and a common base member;

wherein the holder, the vacuum chamber, and the energy beam generator are fixed to the common base member.

The common base member provides a common reference during assembly of the apparatus, so that the energy beam generator can be easily mounted at a known and fixed relation to the holder, and thereby also in relation to the spindle and the recording medium thereon. The common base member will also prevent any dimensional changes in the vertical walls of the vacuum chamber from affecting the accuracy of the apparatus. Fixing the holder, vacuum chamber and the energy beam generator to the common base member also reduces stack-up of tolerances. Further, the common base member potentially saves material since the thickness of the vacuum chamber walls might be reduced from a rigidity point of view.

According to a preferred embodiment, the vacuum chamber and the energy beam generator are fixed to the common base member from opposite sides thereof. This allows for simple and convenient assembly of the apparatus, the positional relationship between the energy beam generator and the spindle basically being given by the degree of parallelism between the opposite sides of the common base member. Preferably, the base member has the shape of a plate.

According to another preferred embodiment, the energy beam generator extends into the vacuum chamber through an opening defined in the base member, the energy beam generator being pivotable to uncover the opening. This embodiment facilitates maintenance by minimizing the necessary dismantling of the apparatus. To further facilitate maintenance, it is preferred that the spindle motor is included in a detachable unit which is mounted in the holder in alignment with the opening in the base member. The spindle motor, which is susceptible to wear since it contains movable components and is subjected to rapid acceleration and deceleration, can be easily replaced by the operator through the uncovered opening, without excessive dismantling of the apparatus.

In yet another preferred embodiment, the information recording apparatus further comprises a connecting rod extending between the holder and the feed motor unit, the feed motor unit being mounted on the common base member outside the vacuum chamber, the connecting rod extending through an aperture defined in a wall portion of the vacuum chamber; and a flexible sleeve element surrounding the connecting rod outside the vacuum chamber and being sealingly attached to the feed motor unit and the wall portion of the vacuum chamber. Thus, a simple construction is provided that minimizes the risk of ambient air leaking into the vacuum chamber. By mounting the feed motor unit on the common base member, the feed motor unit can be carefully aligned with the holder, the common base member providing a reference plane for such alignment. Preferably, the connecting rod has an interior space extending between the ends of the rod, the ends being sealingly connected to the holder and the feed motor unit, respectively. Thereby, electrical and/or pneumatic connections can be led directly to the spindle motor without need for additional seals or gaskets.

In another preferred embodiment, the holder defines an atmospheric chamber enclosing the spindle motor, the spindle extending from the spindle motor into the vacuum chamber through a magnetic fluid seal producing means, and the spindle comprising a spindle portion of essentially non-magnetic material extending from the magnetic seal producing means into the vacuum chamber and a surface portion of magnetic material on a level with the magnetic seal producing means. This arrangement will minimize the magnetic field in the vacuum chamber, since the magnetic field generated by the spindle motor and the magnetic fluid seal producing means is effectively confined to the atmospheric chamber.

In yet another preferred embodiment, the information recording apparatus further comprises a distance sensor mounted on a beam-emitting end of the energy beam generator in the vacuum chamber. Thus, it is possible to continuously monitor the distance to the recording medium and take correcting measures when necessary, thereby further minimizing the influence of any dimensional changes in the apparatus and any out-of-flatness or other irregularity of the recording medium. Preferably, the distance sensor has a sensor area defining a central through-hole, wherein the distance sensor is mounted with the through-hole in alignment with a beam outlet of the beam-emitting end. Thereby the distance can be measured at high accuracy for a small region in the immediate vicinity of the focal spot on the recording medium. The high accuracy is achieved by the sensor having a comparatively large surface area, due to its annular shape. Further, as known in the art, a back-scatter detector inside the energy beam generator can be used for optimization of the generator, with respect to focal spot, position etc, before writing on the recording medium, without the need to remove the distance sensor. It is also preferred that the distance sensor is arranged to determine the distance to the recording medium via a level of impedance between the sensor and the recording medium. Such a sensor has been found to be robust and reliable.

BRIEF DESCRIPTION OF THE DRAWINGS

Preferred embodiments of the present invention will now be described, by way of example only, with respect to the attached schematic drawings, wherein.

DETAILED DESCRIPTION OF THE PREFERRED EMBODIMENTS

Figure 1:
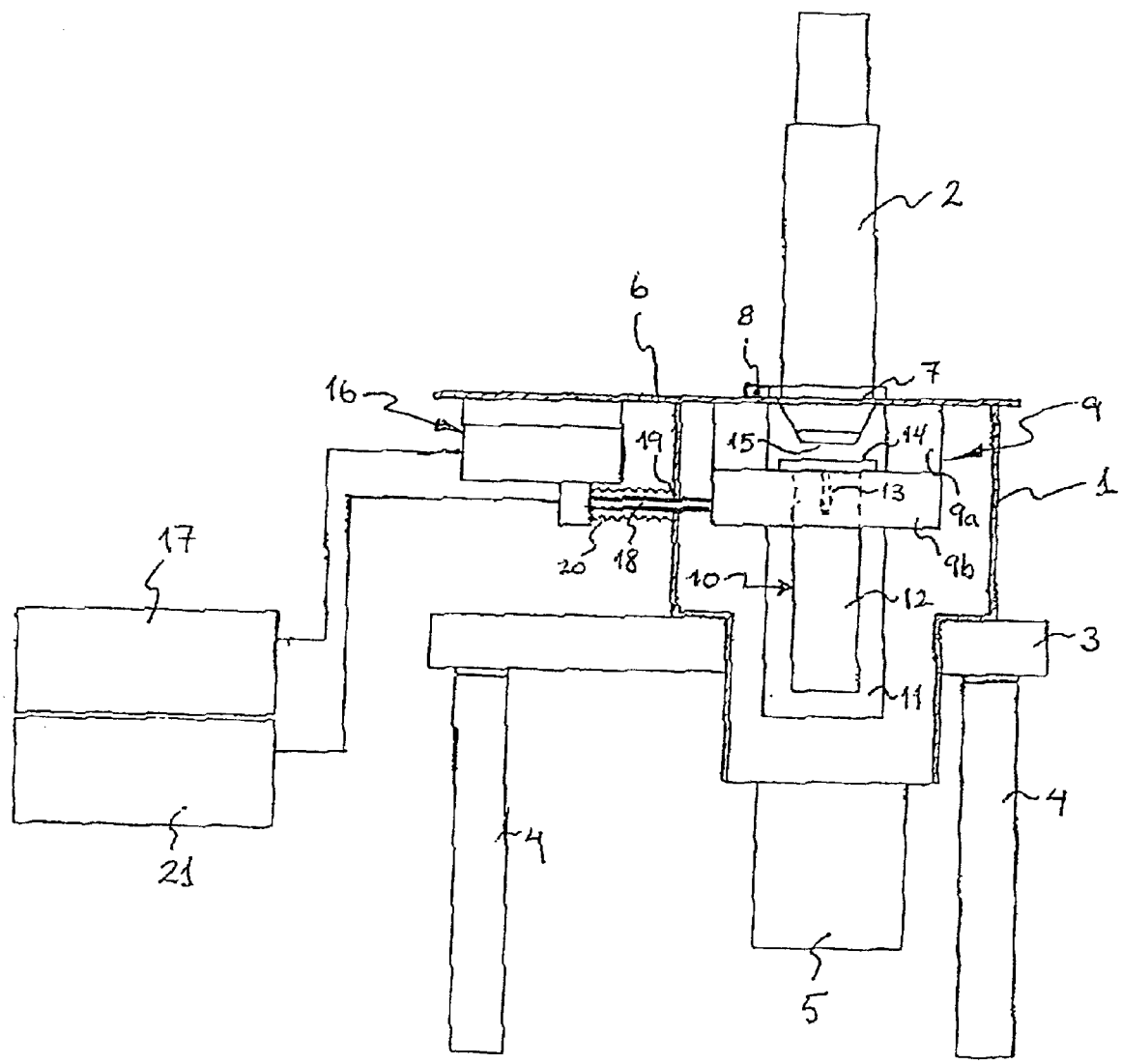
FIG. 1 is an overall view of an information recording apparatus according to the present invention.

Referring to FIG. 1, an information recording apparatus of the present invention comprises a vacuum chamber 1 and an electron gun 2. The bottom portion of the vacuum chamber 1 is carried on a foundation 3 with leg supports 4 and is connected to one or more vacuum pumps 5. The top portion of the vacuum chamber 1 is fixedly connected to one side of a base or reference plate 6. The electron gun 2 is attached to the opposite side of the base plate 6 and extends into the vacuum chamber 1 through an opening 7 in the base plate 6. The electron gun 2 is of conventional design, emitting a beam of electrons in the vacuum chamber 1. A hinge 8 is provided between the electron gun 2 and the base plate 6, so that the electron gun 2 can be swung between a tilted maintenance position and an upright writing position.

Inside the vacuum chamber 1, a substrate holder 9 is attached to the base plate 6. The substrate holder 9 comprises a stationary holder part 9a connected to the base plate, and a movable holder part 9b which is guided in a linear path on the stationary part 9a. The movable holder part 9b carries a spin unit 10. The spin unit 10, which is partly arranged in a casing forming an atmospheric chamber 11 inside the movable holder part 9b, comprises a spindle motor 12, a spindle 13 (indicated with dashed lines in FIG. 1) and a substrate reception surface 14 adjoining the spindle 13 and facing a beam outlet 15 of the electron gun 2. To minimize friction, the spindle 13 is supported on the spindle motor 12 by a pneumatic bearing (not shown), as is well known in the art. Thus, the spindle motor 12 is adapted to effect controlled rotation of the reception surface 14 inside the vacuum chamber 1. For ease of maintenance, the spin unit 10 is formed as a detachable unit. Thus, the operator can simply disengage the unit 10 from the movable holder part 9b and remove it through the opening 7 which is formed essentially in line with the unit 10.

Further, the apparatus comprises a feed motor unit 16 which is connected to the movable holder part 9b to effect a linear movement thereof. The feed motor unit 16 is preferably a high-precision linear motor, typically with a resolution of 2 nm or less, which is electrically connected to a feed control unit 17. The linear motor 16 is attached to the base plate 6 and is connected to the movable holder part 9b by means of a hollow rod 18. The rod 18 extends through a hole 19 in the vacuum chamber wall. A simple seal, which accommodates the movement of the rod 18, is provided by a flexible sleeve in the form of a bellows element 20 that surrounds the rod 18 and is sealingly connected to the linear motor 16 and the vacuum chamber wall. The open ends of the rod 18 communicates with the atmospheric surroundings and the atmospheric chamber 11, respectively, so that a fluid path is established between the atmospheric chamber 11 and the surroundings. Further, electrical cables (not shown) are led from a spin control unit 21 to the spindle motor 12 through the interior of the rod 18.

In another conceivable embodiment (not shown), the feed motor unit is enclosed in a low-vacuum chamber, wherein a vertical wall of the main vacuum chamber forms a partition between the low-vacuum chamber and the main vacuum chamber. The pressure in each chamber is controlled by a respective vacuum pump. The connecting rod extends from the feed motor unit to the substrate holder in the main vacuum chamber through a hole in the vertical wall, the dimensions of the hole being close to those of the rod, so that the leak rate from the low-vacuum chamber to the main vacuum chamber is kept low. In such a two-stage vacuum chamber construction the flexible sleeve element discussed above can be omitted.

In operation, the vacuum chamber 1 is evacuated by means of the vacuum pump 5, and a recording medium or substrate 30 (FIG. 3) is placed on the reception surface 14 inside the vacuum chamber 1, optionally by an automatic loading unit (not shown). This automatic loading unit could also include an air-lock mechanism to allow for introduction of one or more substrates 30 from the outside of the vacuum chamber 1. Then, the spin unit 10 is actuated to rotate the substrate 30, typically at a rate of 50–4000 rpm. Subsequently, the electron gun 2 is controlled to focus a beam B of electrons (FIG. 3) on the substrate 30 to incorporate an information-containing structure therein. Control of the writing operation can be effected by a computer (not shown) or the like. During the writing operation, the substrate 30 is moved helically relative to the beam by the spindle motor 12 rotating the spindle 13 and by the linear motor 16 translating the movable holder part 9b, which is suspended from the base plate 6 by means of the stationary part 9a. When the writing operation is completed, the rotation of the spindle 13 is interrupted and the finished master is removed from the reception surface 14.

Figure 2:
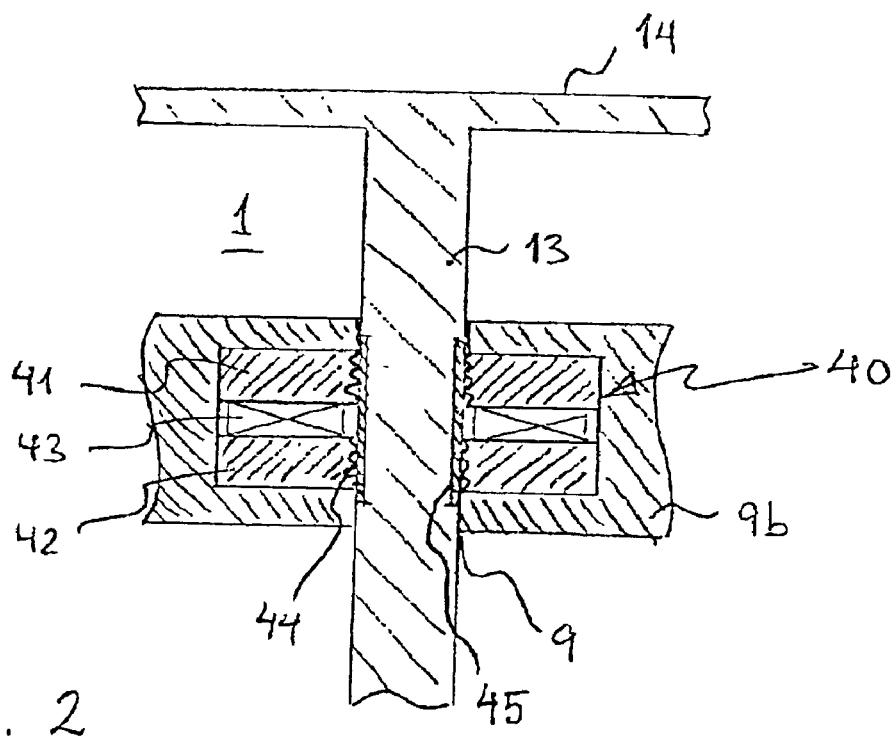
FIG. 2 is an enlarged view of a spindle cooperating with a seal structure in the apparatus of FIG. 1.

FIG. 2 illustrates a preferred embodiment of a seal structure provided between the spindle 13 and the movable holder part 9b to prevent outside atmosphere from leaking into the vacuum chamber 1. In the illustrated embodiment, the spindle 13 extends into the vacuum chamber 1 through a port 9' in the movable holder part 9b. A magnetic seal producing means 40 arranged at the port 9' comprises two pole pieces 41, 42 with a magnet 43 in between. Thus, a closed magnetic circuit is formed so that a magnetic fluid 44 is generated and maintained in the gaps formed between the front ends of the pole pieces 41, 42 and the spindle 13. The spindle 13 is made of essentially nonmagnetic material, such a stainless steel, aluminum or brass. A sleeve 45 of magnetic sheet material, for example $\mu$-metal or soft permeable steel, is attached to the outer periphery of the spindle 13, for example by shrink fitting, adhesive bonding or any other suitable means. The sleeve 45 of magnetic material is aligned with the magnetic seal producing means 40 and is thereby confined within the holder part 9b. This has been found to effectively prevent the generated magnetic fields from reaching the substrate on the receiving surface 14. Further, the combination of two sandwiched materials has also been found to improve the rigidity of the spindle 13. Thus, it is conceivable to provide a sleeve 45 extending further towards the spindle motor 12. Alternatively, not shown, the spindle could be integrally formed with a seal portion of magnetic material and a vacuum-side portion of essentially non-magnetic material.

Figure 3:
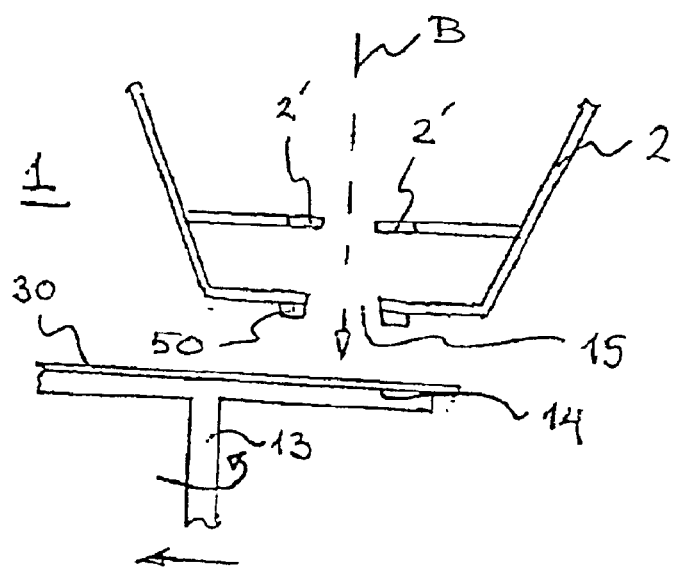
FIG. 3 is an enlarged view of a front portion of an energy beam generator in the apparatus of FIG. 1.

FIG. 3 illustrates a further preferred embodiment of the apparatus according to the invention and shows a front portion of the electron gun 2 which as such is of conventional design. Upstream of the beam outlet 15, as seen in the direction of the beam path B, a backscatter detector 2' is provided in a manner known per se. The output of the backscatter detector 2' is typically used for preparatory optimization of the position of the electron gun 2 before the writing operation, by operating the electron gun 2 in a microscope mode. A distance sensor 50 in the shape of an annular ring is concentrically mounted with respect to the beam outlet 15, such that the beam can pass the center of the sensor 50. The distance sensor 50 is preferably of inductive or capacitive type and senses the distance to the substrate 30 on the receiving surface 14. Alternatively, the sensor could be of optical type. The distance sensor 50 allows for continuous monitoring of the distance to the rotating substrate 30 during the writing operation. Based on the output of the distance sensor 50, the electron gun 2 can be controlled in real time to accommodate for any small changes in distance occurring during the writing operation, for example by optimizing the focal length of a focussing device (not shown) in the electron gun 2. Such changes in distance could for example be due to dimensional changes in the apparatus or out-of-flatness or other irregularity of the substrate 30. The design and location of the distance sensor 50 also allows the operator to use the backscatter detector 2' without removing the distance sensor 50.

While the presently preferred embodiments of the invention have been shown and described above, it is to be understood that these disclosures are for the purpose of illustration and that various changes and modifications may be made without departing from the scope of the invention as set forth in the appended claims. For example, any suitable energy beam could be used for writing and/or editing information on the recording medium, e.g. any beam of charged particles such as ions or electrons. It is also to be understood that the base plate could be an integral part of the vacuum chamber, i.e. integrally formed with the vertical vacuum chamber walls.

What we claim and desire to secure by Letters Patent is:

1. An information recording apparatus, comprising:
   a vacuum chamber;
   an energy beam generator partially enclosed in the vacuum chamber for emitting an energy beam for recording information on a recording medium;
   a spindle disposed in the vacuum chamber for rotating the recording medium, said spindle being driven to rotate by a spindle motor;
   a holder disposed in the vacuum chamber and including a stationary holder part and a movable holder part guided for linear movement with respect to the stationary holder part, said movable holder part carrying the spindle motor and the spindle;
   a feed motor unit connected to the movable holder part for linearly moving the spindle in a vacuum atmosphere within the vacuum chamber; and
   a common base member;
   wherein the stationary holder part of the holder, the vacuum chamber, and the energy beam generator are fixed to the common base member.

2. The information recording apparatus according to claim 1, wherein the common base member has the shape of a plate.

3. The information recording apparatus according to claim 1, wherein the vacuum chamber and the energy beam generator are fixed to the common base member from opposite sides thereof.

4. The information recording apparatus according to claim 3, wherein the energy beam generator extends into the vacuum chamber through an opening defined in the common base member, the energy beam generator being pivotally mounted to the common base member to uncover the opening.

5. The information recording apparatus according to claim 4, wherein the spindle motor is a part of a detachable unit which is mounted in the movable holder part of the holder in alignment with the opening in the common base member.

6. The information recording apparatus according to claim 1, further including:
- a connecting rod extending between the movable holder part and the feed motor unit, the feed motor unit being mounted on the common base member outside the vacuum chamber, the connecting rod extending through an aperture defined in a wall portion of the vacuum chamber; and
- a flexible sleeve element surrounding the connecting rod outside the vacuum chamber and being sealingly attached to the feed motor unit and the wall portion of the vacuum chamber.

7. The information recording apparatus according to claim 6, wherein the connecting rod has an interior space extending between the ends of the rod, the ends being sealingly connected to the movable holder part and the feed motor unit, respectively.

8. The information recording apparatus according to claim 1, wherein the movable holder part defines an atmospheric chamber enclosing the spindle motor, the spindle thereof extending from the spindle motor into the vacuum chamber through a magnetic fluid seal in the movable holder part, and wherein the spindle comprises a spindle portion of essentially non-magnetic material extending from the magnetic seal into the vacuum chamber and a surface portion of magnetic material on a level with the magnetic seal.

9. The information recording apparatus according to claim 8, wherein the surface portion of the spindle is formed by a sheet of magnetic material attached to an elongated stem of said essentially non-magnetic material.

10. The information recording apparatus according to claim 1, further comprising a distance sensor mounted on a beam-emitting end of the energy beam generator in the vacuum chamber.

11. The information recording apparatus according to claim 10, wherein the distance sensor has a sensor area defining a central through-hole, and wherein the distance sensor is mounted with the through-hole in alignment with a beam outlet of the beam-emitting end.

12. The information recording apparatus according to claim 10, wherein the distance sensor is arranged to determine the distance to the recording medium via a level of impedance between the sensor and the recording medium.

* * * * *